Patented Nov. 1, 1927.

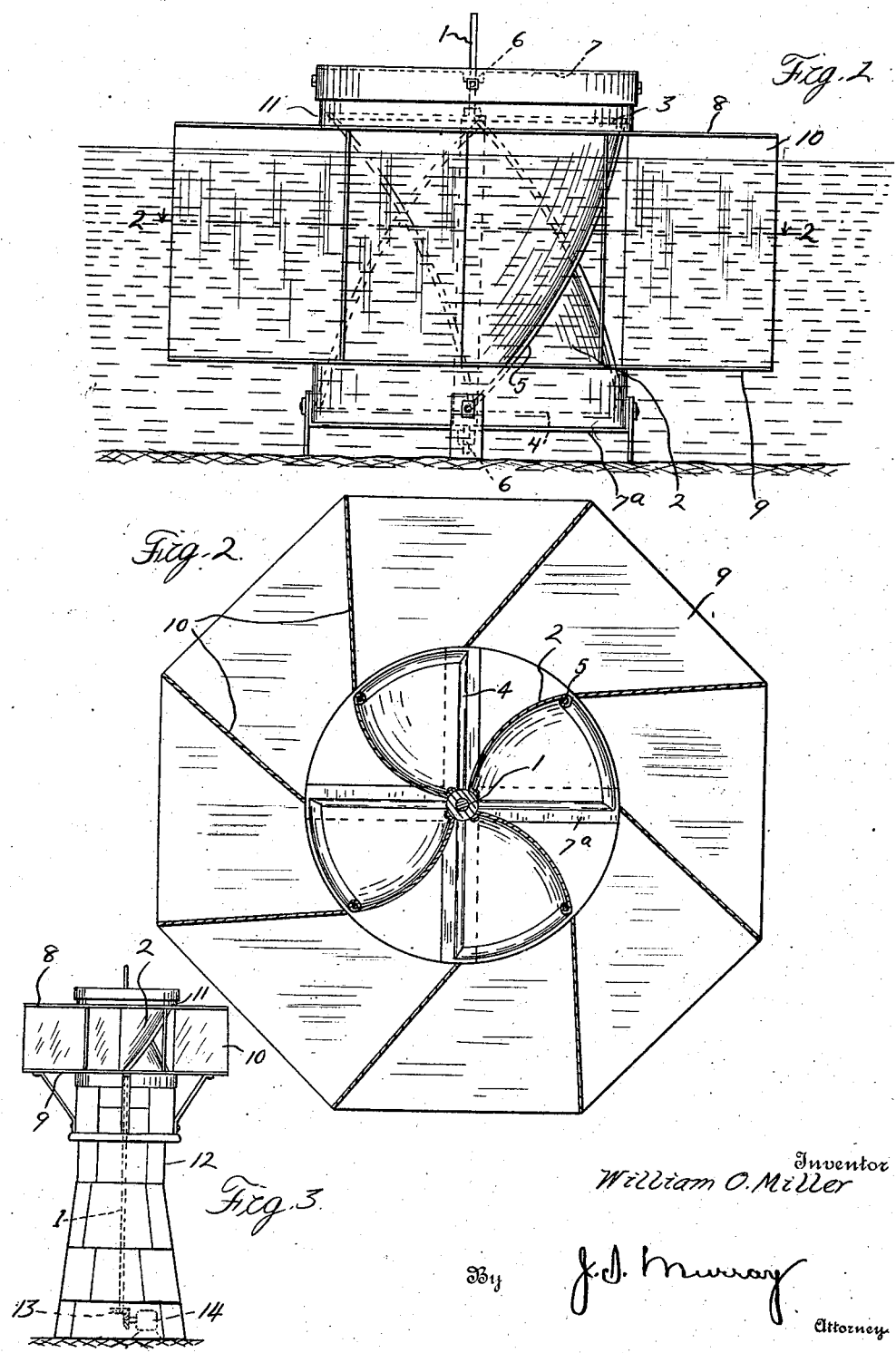

1,647,461

UNITED STATES PATENT OFFICE.

WILLIAM O. MILLER, OF DETROIT, MICHIGAN.

WIND AND TIDE MOTOR.

Application filed July 22, 1925. Serial No. 45,301.

This invention relates to wind and tide motors.

It is an object of the invention to provide a motor which may be driven by wind or tide (or by any moving current of air or water, whether natural or artificial) which will be fully responsive to fluid currents moving transversely to the shaft of said motor, regardless of their direction radial to said shaft.

Another object of the invention is to provide a tide motor the rotor of which will be actuable in a constant direction both by the incoming and outgoing tide and which will further be actuable in the same direction when the surface water is moving in one direction while water at a lower level is reversely moving, thus creating what is commonly termed, an "under-tow."

These and various other objects the invention attains by the construction hereinafter described and illustrated in the accompanying drawing wherein:

Figure 1 is a view in the side elevation of the improved motor.

Figure 2 is a horizontal sectional view of the same taken upon the line 2—2 of Figure 1.

Figure 3 is a view in side elevation showing the mounting of the improved motor upon a tower.

In these views the reference character 1 designates a shaft which as disclosed is vertically mounted and which carries a plurality of vanes 2. Said vanes may extend substantially vertically at their edges engaging the shaft 1 but may be formed of any suitable sheet material and are each preferably reinforced by a framework comprising upper and lower rods 3 and 4, radially carried by the shaft 1, and a substantially spiral rod 5 rigidly connecting the outer ends of the rods 3 and 4.

The shaft 1 is journaled above and below the vanes 2 in bearings 6 respectively carried by a sheet metal disk 7 and a spider member 7ª.

The said disk and spider member are mounted fast upon a fluid guide which comprises top and bottom spaced plates 8 and 9 and vertical deflector members 10 rigidly connecting the members 8 and 9, between the latter. The plates 10 are all tangential to a circle of somewhat lesser radius than that of the vanes 2 so a current flowing from any direction and encountering the motor will be deflected by said members against the outer portions of said vanes. Preferably the disk 7 and bottom spider 7ª are carried by collars 11 which project rigidly upwardly and downwardly from the plates 8 and 9.

When utilizing wind energy it is preferred to mount the described motor, as is best seen in Figure 3, upon a suitable tower 12, as for example, that shown in Figure 3, since as a rule, a stronger air current will be encountered at some elevation above the ground. The shaft 1 of the motor may extend down through the tower and may be geared as indicated at 13 to drive a generator 14 or to deliver motive power wherever desired.

If the device is to be energized by tides, it is immersed as best shown in Figure 1.

Whether the described motor is energized by air or by water, it possesses the advantage that any current moving horizontally (or substantially so) acts with equal efficiency upon the rotor. This follows from the fact that the members 10 act both to deflect the current against the outer portion of the vanes, at one side of the shaft, and also to shield the vanes at the other side of the shaft from any impulse from said current. Thus, regardless of the current direction, (so long as such direction is substantially horizontal) the current is equally effective to drive the described motor.

The ability of the described motor to respond rotatively in a constant direction to forces acting in various directions and even to forces acting oppositely makes the described motor particularly capable of utilizing the tide energy since the direction of drive is unaltered by reversal of the tide, and both the surface current and the reversely flowing underlying current are utilized, when an "under-tow" prevails.

It is to be noted that the described construction is well adapted to be built in large units, yielding a high output of power, since the construction is not required to swivel for the purpose of conforming to current variations, as is true of constructions heretofore used.

It is evident that the direction of drive of the motor will be reversed, if both the rotor and the fluid guide are mounted inversely to the illustrated construction.

What I claim is:

1. A fluid actuable rotor comprising a shaft, a frame carried by said shaft comprising a pair of rods radially projecting from said shaft, spaced both longitudinally and circumferentially thereof and a substantially spiral rod connecting the outer ends of said radial rods, and a vane formed of sheet material and mounted upon said frame.

2. A fluid actuable rotor comprising a shaft, a pair of rods radially carried by said shaft, and spaced apart both longitudinally and circumferentially of said shaft, a substantially spiral rod connecting the outer ends of said radial rods, and a vane formed of sheet material secured at opposite ends to said radial rods, and attached along its inner edge to said shaft, and attached along its outer edge to said spiral rod.

In testimony whereof I sign this specification.

WILLIAM O. MILLER.